United States Patent
Takahashi et al.

(10) Patent No.: US 11,241,797 B2
(45) Date of Patent: Feb. 8, 2022

(54) CONTROL SYSTEM

(71) Applicant: FANUC CORPORATION, Yamanashi (JP)

(72) Inventors: Hiromitsu Takahashi, Yamanashi (JP); Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 175 days.

(21) Appl. No.: 16/576,503

(22) Filed: Sep. 19, 2019

(65) Prior Publication Data

US 2020/0147805 A1 May 14, 2020

(30) Foreign Application Priority Data

Nov. 8, 2018 (JP) .............................. JP2018-210687

(51) Int. Cl.
*B25J 9/16* (2006.01)
*B25J 13/08* (2006.01)

(52) U.S. Cl.
CPC ........... *B25J 9/1697* (2013.01); *B25J 9/1674* (2013.01); *B25J 13/089* (2013.01)

(58) Field of Classification Search
CPC ....... B25J 9/1697; B25J 9/1674; B25J 13/089
See application file for complete search history.

(56) References Cited

U.S. PATENT DOCUMENTS

| 2012/0245709 A1* | 9/2012 | Taira | ..................... | G06F 9/4887 700/11 |
| 2012/0277898 A1* | 11/2012 | Kawai | ..................... | B25J 9/1697 700/114 |
| 2016/0184995 A1* | 6/2016 | Uchiyama | .............. | B25J 9/1697 700/259 |

FOREIGN PATENT DOCUMENTS

| JP | 2889011 B2 | 5/1999 |
| JP | 2006175532 A | 7/2006 |
| JP | 2008183690 A | 8/2008 |
| JP | 2011251384 A | 12/2011 |
| JP | 2014013146 A | 1/2014 |

(Continued)

OTHER PUBLICATIONS

Tsai, Roger Y., "An Efficient and Accurate Camera Calibration Technique for 3D Machine Vision", Proceedings of IEEE Conference On Computer Vision and Pattern Recognition, 1986, pp. 364-374.

(Continued)

*Primary Examiner* — Nicholas Kiswanto
(74) *Attorney, Agent, or Firm* — Studebaker & Brackett PC

(57) ABSTRACT

A control system includes an imaging device and a controller. The controller includes a position conversion unit that detects an object from an image imaged by the imaging device and converts a detection position of the detected object on an image coordinate system or a sensor coordinate system into a detection position of the object on a machine coordinate system, an operation control unit that controls the operation of a machine based on the detection position of the object on the machine coordinate system, a detection range calculation unit that calculates a detection range on the machine coordinate system based on a predetermined detection range in the image on the image coordinate system or the sensor coordinate system, and a position determination unit that determines whether the detection position of the object on the machine coordinate system is within the detection range on the machine coordinate system.

9 Claims, 4 Drawing Sheets

(56) References Cited

FOREIGN PATENT DOCUMENTS

| | | | |
|---|---|---|---|
| JP | 2015066603 | A | 4/2015 |
| JP | 2016061687 | A | 4/2016 |
| JP | 2018001332 | A | 1/2018 |
| JP | 2018111166 | A | 7/2018 |

OTHER PUBLICATIONS

An Office Action; "Notice of Reasons for Refusal," mailed by the Japanese Patent Office dated Nov. 24, 2020, which corresponds to Japanese Patent Application No. 2018-210687 and is related to U.S. Appl. No. 16/576,503; with English language translation.

* cited by examiner

CONTROL SYSTEM

This application is based on and claims the benefit of priority from Japanese Patent Application No. 2018-210687, filed on 8 Nov. 2018, the content of which is incorporated herein by reference.

BACKGROUND OF THE INVENTION

Field of the Invention

The present invention relates to a control system that controls the operation of a machine that performs a predetermined task on an object.

Related Art

For example, in robot systems (control systems), a robot (machine) is provided with a visual function, and recognizes the position of a workpiece (object) by the visual function, thereby performing tasks such as handling or machining of the workpiece. The visual function is realized by imaging the workpiece by a visual sensor (imaging device) mounted near a hand of the robot or a visual sensor installed on the periphery of the robot. In such a robot system, the workpiece is detected from an image imaged, and it is possible to control the operation of the robot so that the robot performs a task with respect to the position of the workpiece detected.

In such a robot system, for example, the position of the workpiece detected (the position in the coordinate system on the image, or the position in a sensor coordinate system, which is viewed from the visual sensor) is converted into the position of the workpiece viewed from the robot (the position in a robot coordinate system) by using calibration data for converting the position of the workpiece on the image into the position of the workpiece viewed from the robot (see, for example, Patent Document 1 and Non-Patent Document 1). As a result, the operation of the robot can be compensated (controlled) so that the robot performs a task with respect to the position (detection position) of the workpiece detected.

Examples of such a compensation include absolute position compensation that causes the tip section of the arm of the robot to move to a detection position of the workpiece and relative position compensation that offsets the operation of the robot using an error (compensation amount) between a predetermined reference position and a detection position of the workpiece.

Patent Document 1: Japanese Patent No. 2889011

Non-Patent Document 1: ROGER Y. TSAI, "An Efficient and Accurate Camera Calibration Technique for 3D Machine Vision", PROCEEDINGS OF IEEE CONFERENCE ON COMPUTER VISION AND PATTERN RECOGNITION, 1986, pages 364-374

SUMMARY OF THE INVENTION

However, the detection position of the workpiece (object) or the compensation amount for compensating (controlling) the operation of the robot (machine) may be incorrect due to external attack, setting error, software malfunction, or other factors. As a result, incorrect compensation (control) may be performed on the operation of the robot (machine), which may harm a person or a peripheral device.

It is an object of the present invention to provide a control system capable of detecting that a detection position of an object or a compensation amount for controlling the operation of a machine is incorrect.

(1) A control system (e.g., a robot system 1 to be described later) according to the present invention that controls an operation of a machine (e.g., a robot 2 to be described later) that performs a predetermined task on an object (e.g., a workpiece W to be described later) includes an imaging device (e.g., a visual sensor 4 to be described later) that images the object and a controller (e.g., a controller 10 to be described later, i.e., a visual sensor controller 20 and a robot controller 30 to be described later) that controls an operation of the imaging device and the machine. The controller includes a position conversion unit (e.g., a position conversion unit 23 to be described later) that detects the object from an image imaged by the imaging device and converts a detection position of the detected object on an image coordinate system or sensor coordinate system into a detection position of the object on a machine coordinate system, in which the image coordinate system is a coordinate system of the image, the sensor coordinate system is a coordinate system of the imaging device, and the machine coordinate system is a coordinate system of the machine; an operation control unit (e.g., an operation control unit 31 to be described later) that controls the operation of the machine based on the detection position of the object on the machine coordinate system or a compensation amount based on an error between the detection position of the object on the machine coordinate system and a predetermined reference position of the object on the machine coordinate system so that the machine performs the predetermined task with respect to the detection position of the object on the machine coordinate system; a detection range calculation unit (e.g., a detection range calculation unit 24 to be described later) that calculates a detection range on the machine coordinate system based on a predetermined detection range in the image on the image coordinate system or the sensor coordinate system; and a position determination unit (e.g., a position determination unit 25 to be described later) that determines whether the detection position of the object on the machine coordinate system or a compensation position based on the reference position of the object on the machine coordinate system and the compensation amount is within the detection range on the machine coordinate system.

(2) An other control system (e.g., a robot system 1 to be described later) according to the present invention that controls an operation of a machine (e.g., a robot 2 to be described later) that performs a predetermined task on an object (e.g., a workpiece W to be described later) includes an imaging device (e.g., a visual sensor 4 to be described later) that images the object and a controller (e.g., a controller 10 to be described later, i.e., a visual sensor controller 20 and a robot controller 30 to be described later) that controls an operation of the imaging device and the machine. The controller includes a position conversion unit (e.g., a position conversion unit 23 to be described later) that detects the object from an image imaged by the imaging device and converts a detection position of the detected object on an image coordinate system or sensor coordinate system into a detection position of the object on a machine coordinate system, in which the image coordinate system is a coordinate system of the image, the sensor coordinate system is a coordinate system of the imaging device, and the machine coordinate system is a coordinate system of the machine; an operation control unit (e.g., an operation control unit 31 to be described later) that controls the operation of the machine based on the detection position of the object on the machine coordinate system or a compensation amount based on an error between the detection position of the object on the machine coordinate system and a predetermined reference position of the object on the machine coordinate system so that the machine performs the predetermined task with respect to the detection position of the object on the machine coordinate system; a position reconversion unit (e.g., a position conversion unit 23 to be described later) that reconverts the detection position of the object on the machine coordinate system converted by the position conversion unit, or a compensation position based on the reference position of the object on the machine coordinate system and the compensation amount into a detection position of the object or a compensation position on the sensor coordinate system; and a position determination unit (e.g., a position determination unit 25 to be described later) that determines whether the detection position of the object or the compensation position on the sensor coordinate system, which is reconverted by the position reconversion unit, is within a predetermined detection range in the image on the sensor coordinate system.

(3) An other control system (e.g., a robot system 1 to be described later) according to the present invention that controls an operation of a machine (e.g., a robot 2 to be described later) that performs a predetermined task on an object (e.g., a workpiece W to be described later) includes an imaging device (e.g., a visual sensor 4 to be described later) that images the object and a controller (e.g., a controller 10 to be described later, i.e., a visual sensor controller 20 and a robot controller 30 to be described later) that controls an operation of the imaging device and the machine. The controller includes a position conversion unit (e.g., a position conversion unit 23 to be described later) that detects the object from an image imaged by the imaging device and converts a detection position of the detected object on an image coordinate system or sensor coordinate system into a detection position of the object on a machine coordinate system, in which the image coordinate system is a coordinate system of the image, the sensor coordinate system is a coordinate system of the imaging device, and the machine coordinate system is a coordinate system of the machine; an operation control unit (e.g., an operation control unit 31 to be described later) that controls the operation of the machine based on the detection position of the object on the machine coordinate system or a compensation amount based on an error between the detection position of the object on the machine coordinate system and a predetermined reference position of the object on the machine coordinate system so that the machine performs the predetermined task with respect to the detection position of the object on the machine coordinate system; a position reconversion unit (e.g., a position conversion unit 23 to be described later) that reconverts the detection position of the object on the machine coordinate system converted by the position conversion unit, or a compensation position based on the reference position of the object on the machine coordinate system and the compensation amount into a detection position of the object or a compensation position on the image coordinate system; and a position determination unit (e.g., a position determination unit 25 to be described later) that determines whether the detection position of the object or the compensation position on the image coordinate system, which is reconverted by the position reconversion unit, is within a predetermined detection range in the image on the image coordinate system.

(4) In the control system described in any one of (1) to (3), the controller may further include a notification control unit (e.g., a notification control unit 32 to be described later) that, if the position determination unit determines that the detection position of the object or the compensation position is not within the detection range, externally notifies that, the detection position of the object or the compensation amount on the machine coordinate system, which is used in the operation control unit, is not correct.

(5) In the control system described in any one of (1) to (3), the controller may further include a stop control unit (e.g., a stop control unit 33 to be described later) that stops the operation of the machine if the position determination unit determines that the detection position of the object or the compensation position is not within the detection range.

According to the present invention, it is possible to provide a control system capable of detecting that a detection position of an object or a compensation amount for controlling the operation of a machine is incorrect.

DETAILED DESCRIPTION OF THE INVENTION

Figure 1:
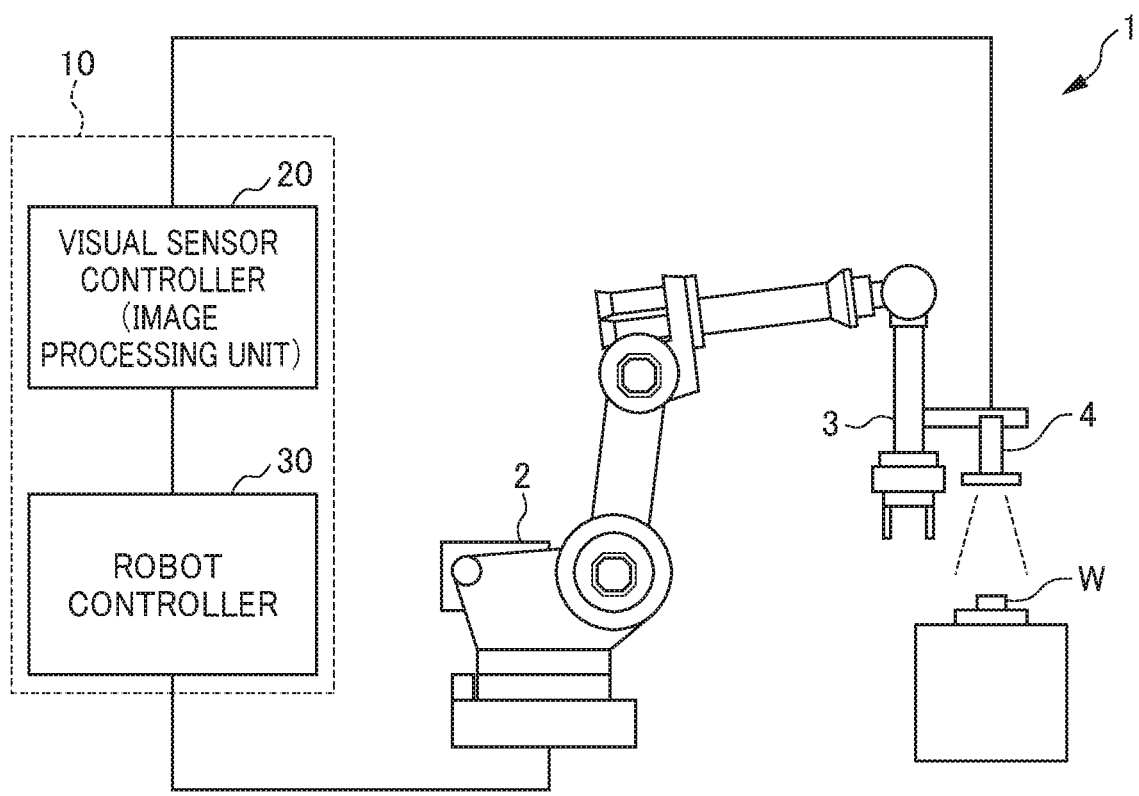
FIG. 1 is a diagram showing the configuration of a robot system according to a first embodiment.

With reference to the attached drawings, an example of the embodiments of the present invention will be described. In the drawings, the same or corresponding portions are denoted by the same reference numerals.

First Embodiment

FIG. 1 is a diagram showing the configuration of a robot system according to the first embodiment. The robot system (control system) 1 shown in FIG. 1 includes a robot (machine) 2, a visual sensor (imaging device) 4, and a controller 10 composed of a visual sensor controller 20 and a robot controller 30. The robot system 1 is, for example, a system that recognizes a position of a workpiece (object) W based on an image of the workpiece W imaged by the visual sensor 4, and performs a predetermined task such as handling or machining of the workpiece W.

A hand or tool is attached to a tip section of an arm 3 of the robot 2. The robot 2 performs a predetermined task such as handling or machining of the workpiece W under the control of the robot controller 30. The visual sensor 4 is attached to the tip section of the arm 3 of the robot 2.

The visual sensor 4 images the workpiece W under the control of the visual sensor controller 20. In the present embodiment, a visual sensor is provided as an example of the imaging device, but the present invention is not limited thereto. For example, instead of the visual sensor, a common camera may be used, or a stereo camera or the like capable of performing three-dimensional measurements may be used.

The visual sensor controller 20 controls the visual sensor 4. The visual sensor controller 20 also detects a position and posture of the workpiece W from an image of the workpiece W imaged by the visual sensor 4.

The robot controller 30 executes an operation program of the robot to control the operation of the robot 2. At this time, the robot controller 30 compensates the operation of the robot 2 so that the robot 2 performs a predetermined task with respect to the position of the workpiece W detected by the visual sensor controller 20.

In addition, the robot controller 30 controls a position and posture of the robot 2 so as to control a position and posture of the visual sensor 4 when the visual sensor 4 images. Thus, in the robot system 1, the position and posture of the workpiece W are fixed, and the position and posture of the visual sensor 4 are controlled, thereby controlling relative position of the workpiece W and the visual sensor 4. The controller 10, i.e., the visual sensor controller 20 and the robot controller 30 will be described in detail.

Figure 2:
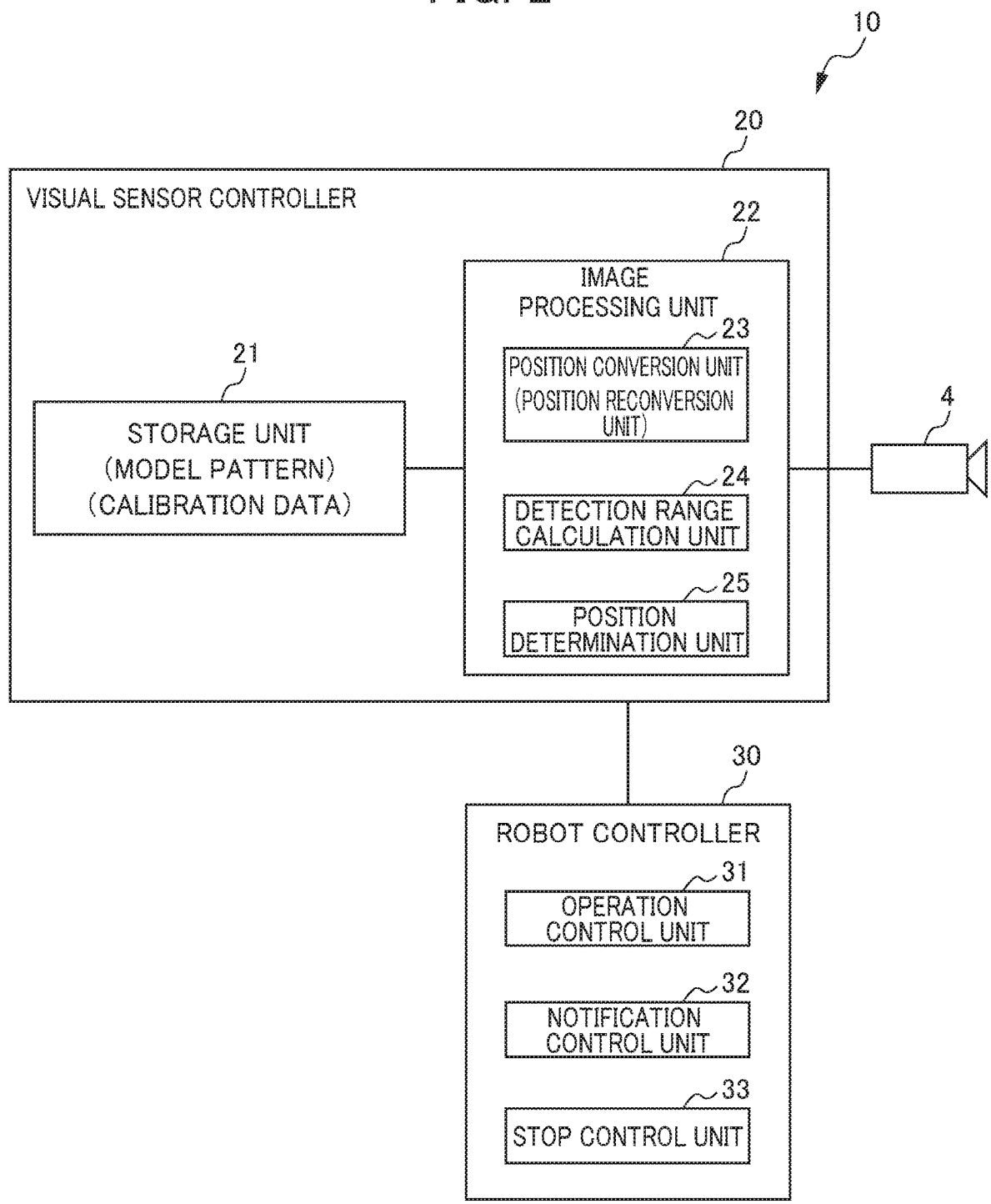
FIG. 2 is a diagram showing the configuration of a controller, i.e., a visual sensor controller and a robot controller, in the robot system according to the first embodiment.

FIG. 2 is a diagram showing the configuration of the controller 10, i.e., the visual sensor controller 20 and the robot controller 30, in the robot system 1 according to the first embodiment. The visual sensor controller 20 includes a storage unit 21 and an image processing unit 22, and the image processing unit 22 includes a position conversion unit 23, a detection range calculation unit 24, and a position determination unit 25. The robot controller 30 includes an operation control unit 31, a notification control unit 32, and a stop control unit 33. The position conversion unit 23, the detection range calculation unit 24, the position determination unit 25, the notification control unit 32, and the stop control unit 33 may be configured in the controller 10, and may be configured in either the visual sensor controller 20 or robot controller 30.

The storage unit 21 in the visual sensor controller 20 is a rewritable memory such as an EEPROM. The image processing unit 22 in the visual sensor controller 20 and the robot controller 30 are composed of an arithmetic processor such as a digital signal processor (DSP) or a field-programmable gate array (FPGA). Various functions of the image processing unit 22 in the visual sensor controller 20 and the robot controller 30 are realized, for example, by executing predetermined software (program, application) stored in the storage unit. Various functions of the image processing unit 22 in the visual sensor controller 20 and the robot controller 30 may be realized by combination of hardware and software, or may be realized by only hardware (electronic circuit).

The storage unit 21 stores a model pattern in which an image of the workpiece W is modeled, for example, a model pattern representing the characteristics of the workpiece W. In addition, the storage unit 21 stores calibration data of the visual sensor 4, for example, calibration data for converting a two-dimensional position on an image coordinate system into a value on a three-dimensional coordinate or the opposite conversion. With respect to the format of the calibration data and the method for obtaining the calibration data, various methods have been proposed, and any of the methods may be used (for example, see Non-Patent Document 1).

The position conversion unit 23 detects the workpiece W from an image imaged by the visual sensor 4. The position conversion unit 23 converts a detection position of the workpiece W on the image coordinate system (two-dimensional) or a detection position of the workpiece W on a sensor coordinate system (three-dimensional) into a detection position of the workpiece W on a robot coordinate system (three-dimensional) based on a model pattern and calibration data stored in the storage unit 21 and a position of the tip section of the arm 3 of the robot 2 (i.e., a position of the visual sensor 4) at the time of imaging. The image coordinate system refers to a coordinate system (two-dimensional) defined on the image, and the sensor coordinate system refers to a coordinate system (three-dimensional) viewed from the visual sensor 4. The robot coordinate system (machine coordinate system) refers to a coordinate system (three-dimensional) viewed from the robot 2.

The operation control unit 31 controls and compensates the operation of the robot 2 so that the robot 2 performs a predetermined task with respect to the detection position of the workpiece W on the robot coordinate system. Such compensations include absolute position compensation and relative position compensation. In the absolute position compensation, the operation control unit 31 compensates the movement of the tip section of the arm 3 of the robot 2 based on the detection position of the workpiece W on the robot coordinate system. On the other hand, in the relative position compensation, the position (reference position) of the workpiece W to be a reference is determined in advance. The operation control unit 31 calculates the error between the reference position of the workpiece W on the robot coordinate system and the detection position of the workpiece W on the robot coordinate system as a compensation amount, and multiplies the operation of the robot 2 previously taught by the compensation amount to compensate the movement of the tip section of the arm 3 of the robot 2.

In this regard, the detection position of the workpiece W or compensation amount for compensating (controlling) the operation of the robot 2 may be incorrect due to a factor such as an external attack, a setting error, or a software malfunction. This may result in incorrect compensation (control) on the operation of the robot, which can harm a person or a peripheral device.

Therefore, in the present embodiment, it is confirmed whether the detection position of the workpiece W on the robot coordinate system or a compensation position based on the reference position of the workpiece W and the compensation amount on the robot coordinate system, which is used by the operation control unit 31, is a physically appropriate position. In the case of the workpiece W imaged by the visual sensor 4, the detection position of the workpiece W or the compensation position does not fall outside the imaging range. Therefore, it is checked in the robot coordinate system whether the detection position of the workpiece W or the compensation position is within the imaging range, and if the detection position of the workpiece W or the compensation position is outside the range, the robot 2 is prevented from moving to that position. Specifically, the controller 10 of the present embodiment includes the detection range calculation unit 24, the position determination unit 25, the notification control unit 32, and the stop control unit 33.

The detection range calculation unit 24 calculates an appropriate detection range on the robot coordinate system based on a predetermined detection range in an image on the image coordinate system or on the sensor coordinate system and the position of the tip section of the arm 3 (i.e., the position of the visual sensor 4) of the robot 2 at the time of imaging. The predetermined detection range in the image may be the entire image or a portion of the image.

Figure 3:
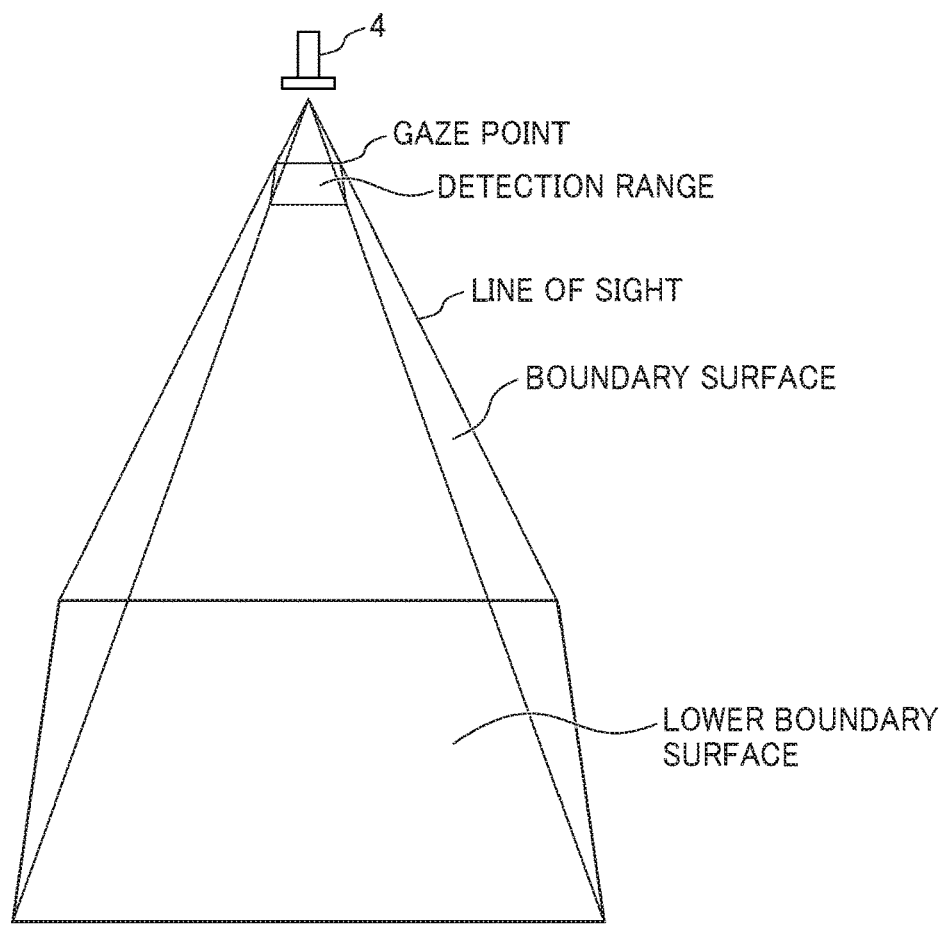
FIG. 3 is a diagram for illustrating an example of how to determine an appropriate detection range.

FIG. 3 is a diagram for illustrating an example of how to determine an appropriate detection range. FIG. 3 shows an example in which the predetermined detection range in the image is rectangular. In this regard, if calibration data is obtained, when three-dimensional points (gaze points) on the robot coordinate system are given, the position of the image of the three-dimensional points on the image of the visual sensor, i.e., a two-dimensional point on the image coordinate system, can be calculated. Also, when a two-dimensional point on the image coordinate system that is the image of gaze points is given, the lines of sight (three-dimensional straight lines passing through the gaze points and the focus of the visual sensor) in the robot coordinate system can be calculated.

First, the detection range calculation unit 24 acquires the positions of the four corners of the predetermined detection range in the image on the image coordinate system or the sensor coordinate system. Next, the detection range calculation unit 24 determines the lines of sight of the visual sensor 4 on the robot coordinate system when, based on the positions of the four corners of the detection range acquired and the position of the tip section of the arm 3 of the robot 2 (i.e., the position of the visual sensor 4) at the time of imaging, the respective positions are defined as the gaze points of the visual sensor 4. Next, the detection range calculation unit 24 determines four boundary surfaces connecting adjacent lines of sight. Next, the detection range calculation unit 24 sets the inside of the four boundary surfaces as an appropriate detection range on the robot coordinate system.

Such a range is an infinite range in which the lower side is open. Therefore, such a range may be a finite range in which the lower side is closed by defining a predetermined plane as a boundary surface. For example, a floor surface may be defined as a plane on the robot coordinate system, and this may be the lower boundary surface. The detection range is not limited to be rectangular. For example, if the detection range is circular, four gaze points are not sufficient, and the gaze points and boundary surfaces may be taken more finely. (Actually, since there are some effects such as lens distortion, it is not correct to simply connect the lines of sight to one another, to be exact. In order to obtain the detection range more accurately, the gaze points may be set in a finer unit.) Further, if it is known that the workpiece moves on a plane only two-dimensionally, the inner area formed by cutting at the boundary surface on the plane is an appropriate detection range.

The position determination unit 25, for example, determines whether the detection position of the workpiece W on the robot coordinate system is within an appropriate range, immediately before the robot operates. For example, if the operation control unit 31 performs absolute position compensation, the position determination unit 25 may check whether the detection position itself is within an appropriate range. On the other hand, if the operation control unit 31 performs relative position compensation, the detection position itself may be checked, or whether the value obtained by multiplying the reference position by the compensation amount is within an appropriate range may be checked.

Specifically, the position determination unit 25 determines whether the detection position of the workpiece W on the robot coordinate system is within the detection range on the robot coordinate system. Alternatively, the position determination unit 25 determines whether the compensation position based on the reference position of the workpiece W and the compensation amount on the robot coordinate system is within the detection range on the robot coordinate system.

The notification control unit 32, if the detection position of the workpiece W or the compensation position on the robot coordinate system is not within an appropriate detection range, notifies the user that the detection position of the workpiece W or compensation amount on the robot coordinate system, which is used in the operation control unit 31, is incorrect. The notification control unit 32 performs notification using a display device such as a display.

The stop control unit 33, if the detection position of the workpiece W or the compensation position on the robot coordinate system is not within an appropriate detection range, stops the operation of the robot 2 because the detection position of the workpiece W or compensation amount on the robot coordinate system, which is used in the operation control unit 31, is incorrect.

Next, the operation of determining the detection position of the workpiece by the controller 10, i.e., the visual sensor controller 20 and the robot controller 30, in the robot system 1 will be described.

First, the visual sensor controller 20 causes the tip section of the arm 3 of the robot 2 to move so that the workpiece W falls within the imaging range of the visual sensor 4, and the visual sensor 4 images the workpiece W. At this time, the visual sensor controller 20 records the position of the tip section of the arm 3 of the robot 2 at the time of imaging.

Next, the image processing unit 22 in the visual sensor controller 20 detects the workpiece W from the predetermined detection range in the imaged image, using known image processing or the like. As a result, the image processing unit 22 acquires the position and posture of the workpiece W on the image coordinate system or the sensor coordinate system.

Next, the position conversion unit 23 in the visual sensor controller 20 converts the detection position of the workpiece W on the image coordinate system or the sensor coordinate system to the detection position of the workpiece W on the robot coordinate system, using the model pattern and calibration data stored in the storage unit 21 and the position of the tip section of the arm 3 of the robot 2 (i.e., the position of the visual sensor 4) at the time of imaging.

Next, as mentioned above and as shown in FIG. 3, the detection range calculation unit 24 in the visual sensor controller 20 calculates an appropriate detection range on the robot coordinate system based on the predetermined detection range in the image on the image coordinate system or the sensor coordinate system and the position of the tip section of the arm 3 of the robot 2 (i.e., the position of the visual sensor 4) at the time of imaging.

Immediately prior to operating the robot, the position determination unit 25 in the visual sensor controller 20 determines whether the detection position of the workpiece W on the robot coordinate system, which is used in the operation control unit 31 in the robot controller 30, is within an appropriate detection range. For example, if the operation control unit 31 performs absolute position compensation, the position determination unit 25 determines whether the detection position of the workpiece W on the robot coordinate system is within the detection range on the robot coordinate system. On the other hand, if the operation control unit 31 performs relative position compensation, the position determination unit 25 determines whether the compensation position based on the reference position of the workpiece W and the compensation amount on the robot coordinate system is within the detection range on the robot coordinate system.

If the detection position of the workpiece W or the compensation position on the robot coordinate system is within an appropriate detection range, the operation of the robot 2 is initiated. At this time, the operation control unit 31 in the robot controller 30 controls and compensates the operation of the robot 2 so as to perform a predetermined task with respect to the detection position of the workpiece W on the robot coordinate system. In absolute position compensation, the operating control unit 31 compensates the movement of the tip section of the arm 3 of the robot 2 based on the detection position of the workpiece W on the robot coordinate system. On the other hand, in relative position compensation, the operation control unit 31 calculates the error between the reference position of the workpiece W on the robot coordinate system and the detection position of the workpiece W on the robot coordinate system as a compensation amount, and multiplies the operation of the robot 2 previously taught by the compensation amount to compensate the movement of the tip section of the arm 3 of the robot 2.

On the other hand, if the detection position of the workpiece W or the compensation position on the robot coordinate system is not within an appropriate detection range, the notification control unit 32 in the robot controller 30 notifies the user that the detection position of the workpiece W or the compensation amount on the robot coordinate system, which is used in the operation control unit 31, is incorrect. This can call the user's attention. The stop control unit 33 in the robot controller 30 stops the operation of the robot 2.

As described above, the robot system 1 of the present embodiment includes the detection range calculation unit 24 that calculates a detection range on the robot coordinate system based on a predetermined detection range in an image on the image coordinate system or sensor coordinate system, and the position determination unit 25 that determines whether a detection position of the workpiece W on the robot coordinate system, or a compensation position based on a reference position of the workpiece W on the robot coordinate system and a compensation amount is within the detection range on the robot coordinate system. Thus, according to the robot system 1 of the present embodiment, if the position determination unit 25 determines that the detection position of the workpiece W on the robot coordinate system, or the compensation position based on the reference position of the workpiece W on the robot coordinate system and the compensation amount is not within the detection range on the robot coordinate system, it is possible to detect that the detection position of the workpiece W or compensation amount for compensating (controlling) the operation of the robot 2 is incorrect.

In addition, the robot system 1 of the present embodiment includes the notification control unit 32 that, if the position determination unit 25 determines that the detection position of the workpiece W or the compensation position is not within the detection range, externally notifies that the detection position of the workpiece W or the compensation amount on the robot coordinate system, which is used in the operation control unit 31, is incorrect. Thus, according to the robot system 1 of the present embodiment, even if the detection position of the workpiece W or the compensation amount for compensating (controlling) the operation of the robot is incorrect due to some factor, the movement of the robot 2 can be suppressed to a minimum. As a result, it is possible to suppress incorrect compensation (control) on the operation of the robot 2 and to suppress harming people or peripheral devices.

The robot system 1 of the present embodiment includes the stop control unit 33 that, if the position determination unit 25 determines that the detection position of the workpiece W or the compensation position is not within the detection range, stops the operation of the robot 2. Thus, according to the robot system 1 of the present embodiment, even if the detection position of the workpiece W or the compensation amount for compensating (controlling) the operation of the robot is incorrect due to some factor, the movement of the robot 2 can be suppressed. As a result, it is possible to suppress harming people or peripheral devices.

Modification 1

In the first embodiment, it is determined whether the detection position of the workpiece W on the robot coordinate system is within an appropriate range, but it may also be determined whether the detection position of the workpiece W on the sensor coordinate system is within an appropriate range.

In the robot system 1 of Modification 1, the function and operation of the position conversion unit 23 and position determination unit 25 in the visual sensor controller 20 differ from those in the robot system 1 of the first embodiment. Further, in the robot system 1 of Modification 1, the detection range calculation unit 24 in the visual sensor controller 20 may not be provided.

The position conversion unit 23 functions as a position reconversion unit, and reconverts a converted detection position of the workpiece W on the robot coordinate system, or a compensation position based on the reference position of the workpiece W on the robot coordinate system and the compensation amount, into a detection position of the workpiece W or a compensation position on the sensor coordinate system.

The position determination unit 25 determines whether the reconverted detection position of the workpiece W on the sensor coordinate system or the reconverted compensation position on the sensor coordinate system is within the predetermined detection range in the image on the sensor coordinate system.

Figure 4:
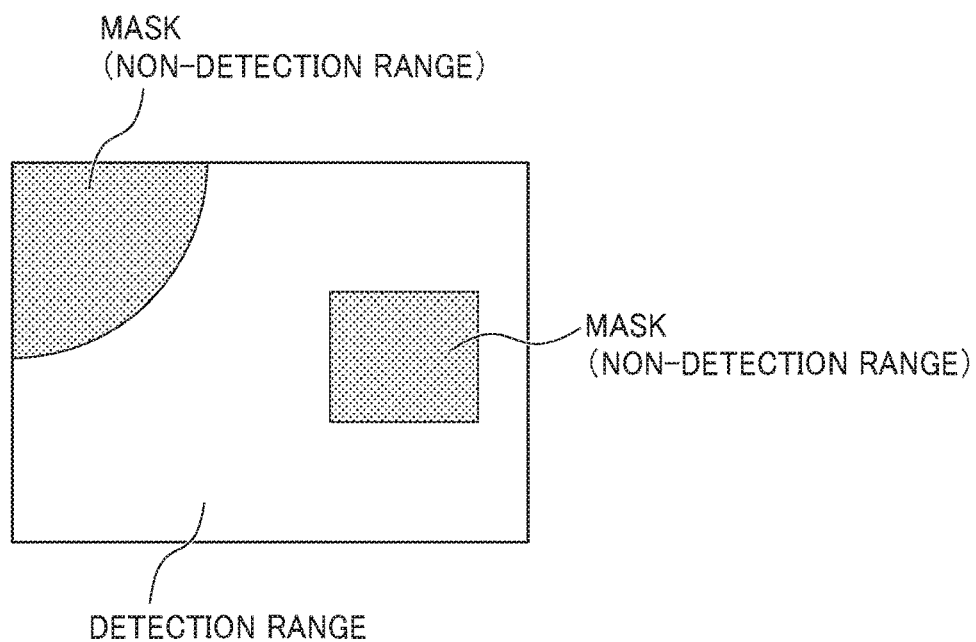
FIG. 4 is a diagram for illustrating an example of a predetermined detection range in an image.

Here, as described above, if the predetermined detection range in the image is in a complicated shape such as a circle, the calculation of the detection range on the robot coordinate system by the detection range calculation unit 24 becomes complicated. As shown in FIG. 4, ranges that are not detected in the image may be masked. In such a case, the predetermined detection range in the image is in a complicated shape, and the calculation of the detection range on the robot coordinate system by the detection range calculation unit 24 also becomes complicated.

In this regard, according to the robot system 1 of Modification 1, the complicated calculation of the detection range on the robot coordinate system by the detection range calculation unit 24 becomes unnecessary.

Modification 2

It may also be determined whether the detection position of the workpiece W on the image coordinate system is within an appropriate range.

In the robot system 1 of Modification 2, the function and operation of the position conversion unit 23 and position determination unit 25 in the visual sensor controller 20 differ from those in the robot system 1 of the first embodiment. Further, in the robot system 1 of Modification 2, the detection range calculation unit 24 in the visual sensor controller 20 may not be provided.

The position conversion unit 23 functions as a position reconversion unit, and reconverts a converted detection position of the workpiece W on the robot coordinate system, or a compensation position based on the reference position of the workpiece W on the robot coordinate system and the compensation amount, into a detection position of the workpiece W or a compensation position on the image coordinate system.

The position determination unit 25 determines whether the reconverted detection position of the workpiece W on the image coordinate system or the reconverted compensation position on the image coordinate system is within the predetermined detection range in the image on the image coordinate system.

According to the robot system 1 of Modification 2, the complicated calculation of the detection range on the robot coordinate system by the detection range calculation unit 24 also becomes unnecessary.

Second Embodiment

The first embodiment illustrates an aspect in which a visual sensor 4 is attached to the tip section of the arm 3 of the robot 2, and the sensor is moved. The second embodiment illustrates an aspect in which two visual sensors 4 are fixedly installed.

Figure 5:
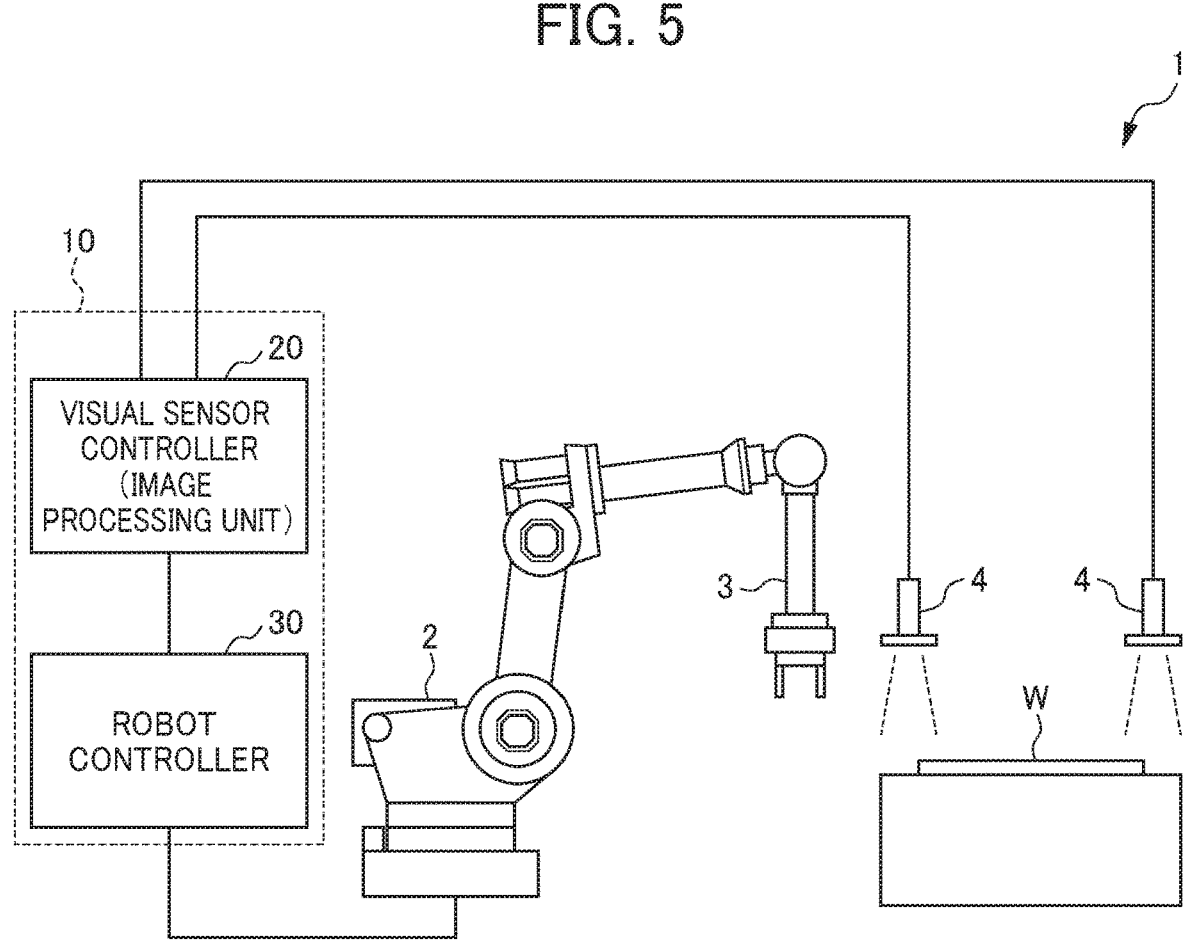
FIG. 5 is a diagram showing the configuration of a robot system according to a second embodiment.

FIG. 5 is a diagram showing the configuration of the robot system 1 according to the second embodiment. The robot system 1 shown in FIG. 5 differs from the robot system 1 shown in FIG. 1 in that two visual sensors 4 are provided and these visual sensors 4 are fixedly installed.

Figure 6:
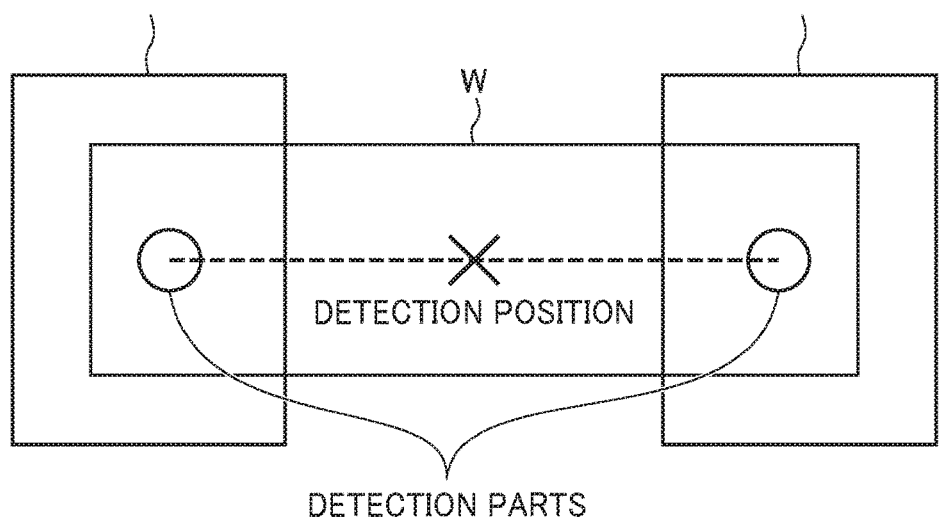
FIG. 6 is a diagram for illustrating an example of how to determine a detection position of a workpiece on a robot coordinate system.

If the workpiece W is large so as not to fit in the field of view of a vision sensor 4, the respective vision sensors 4 detect the characteristics of the end portions of the workpiece W, and, for example, the midpoint of the two detection parts is set as the detection position of the entire workpiece W. For example, as shown in FIG. 6, the position conversion unit 23 detects an end portion of the workpiece W from an image imaged for each visual sensor 4, and converts a detection part of the detected end portion of the workpiece W on the image coordinate system or the sensor coordinate system into a detection part of an end portion of the workpiece W on the robot coordinate system. The position conversion unit 23 sets the midpoint of the detection parts of the end portions of the workpiece W on the robot coordinate system as the detection position of the workpiece W on the robot coordinate system.

At this time, as in the first embodiment, the inside of the predetermined detection range or the imaging range in the image cannot be an appropriate detection range. In this instance, as shown in FIG. 6, an appropriate detection range of each visual sensor 4 is determined in the same manner as in the first embodiment. If each detection part is detected within each appropriate detection range, a range in which the midpoint (detection position) of the workpiece W determined as described above can move is determined, and this range can be set as an appropriate detection range of the detection position of the entire workpiece W.

In other words, for example, if both end portions of the workpiece W in a long shape are detected by the respective visual sensors 4 and the midpoint thereof or the like is set as the detection position, the synthesized detection position can be out of the range of the image. However, this is the case where there is no problem that the detection position is out of the range of the image, and it is necessary to perform another check. In this case, the synthesized detection position falls within the zone connecting the two imaging ranges, and it is possible to perform such a check.

For example, the detection range calculation unit 24 calculates a detection range on the robot coordinate system based on a predetermined detection range in an image on the image coordinate system or on the sensor coordinate system for each visual sensor 4.

The position determination unit 25 determines whether the detection position (midpoint) of the workpiece W on the robot coordinate system, or the compensation position based on the reference position of the workpiece W on the robot coordinate system and the compensation amount is within the zone connecting the two detection ranges on the robot coordinate system.

According to the robot system 1 of the second embodiment, even if the workpiece W is large so as not to fit in the field of view of a vision sensor 4, it is possible to detect that the detection position of the workpiece W or the compensation amount for compensating the operation of the robot 2 is incorrect.

While the above description has been given of the embodiments of the present invention, the present invention is not limited to the above-described embodiments, and various modifications and variations can be made. For example, in the second embodiment described above, a robot system 1 in which two visual sensors 4 are fixedly installed is illustrated, but the robot system may be configured such that three or more visual sensors are fixedly installed. Also, in this instance, the position conversion unit may detect an end portion of the workpiece from an imaged image for each visual sensor, convert a detection part of the detected end portion of the workpiece on the image coordinate system or sensor coordinate system into a detection part of an end portion of the workpiece on the robot coordinate system, and set the center of gravity of the detection parts of the end portions of the workpiece on the robot coordinate system as the detection position of the workpiece on the robot coordinate system. The detection range calculation unit also calculates a detection range on the robot coordinate system based on a predetermined detection range in an image on the image coordinate system or the sensor coordinate system for each visual sensor. The position determination unit may determine whether the detection position (center of gravity) of the workpiece on the robot coordinate system or the compensation position based on the reference position of the workpiece on the robot coordinate system and the compensation amount is within the zone connecting a plurality of the detection ranges on the robot coordinate system.

In the above-described embodiments, a robot system that controls the operation of the robot is illustrated. However, the present invention is not limited to this, and can be applied to various control systems that control the operation of various machines (e.g., robot and machine tool) that perform a predetermined task on an object.

EXPLANATION OF REFERENCE NUMERALS

1 ROBOT SYSTEM (CONTROL SYSTEM)
2 ROBOT (MACHINE)
3 ARM
4 VISUAL SENSOR (IMAGING DEVICE)
10 CONTROLLER
20 VISUAL SENSOR CONTROLLER
21 STORAGE UNIT
22 IMAGE PROCESSING UNIT
23 POSITION CONVERSION UNIT (POSITION RECONVERSION UNIT)
24 DETECTION RANGE CALCULATION UNIT

25 POSITION DETERMINATION UNIT
30 ROBOT CONTROLLER
31 OPERATION CONTROL UNIT
32 NOTIFICATION CONTROL UNIT
33 STOP CONTROL UNIT
W WORKPIECE (OBJECT)

What is claimed is:

1. A control system that controls an operation of a machine that performs a predetermined task on an object, comprising:
an imaging device that images the object; and
a controller that controls an operation of the imaging device and the machine,
the controller comprising:
a position conversion unit that detects the object from an image imaged by the imaging device and converts a detection position of the detected object on an image coordinate system or a sensor coordinate system into a detection position of the object on a machine coordinate system, wherein the image coordinate system is a coordinate system of the image, the sensor coordinate system is a coordinate system of the imaging device, and the machine coordinate system is a coordinate system of the machine;
an operation control unit that controls the operation of the machine based on the detection position of the object on the machine coordinate system, or based on a compensation amount based on an error between the detection position of the object on the machine coordinate system and a predetermined reference position of the object on the machine coordinate system, so that the machine performs the predetermined task with respect to the detection position of the object on the machine coordinate system;
a detection range calculation unit that calculates a detection range on the machine coordinate system based on a predetermined detection range in the image on the image coordinate system or the sensor coordinate system; and
a position determination unit that determines whether the detection position of the object on the machine coordinate system or a compensation position based on the reference position of the object on the machine coordinate system and the compensation amount is within the detection range on the machine coordinate system.

2. A control system that controls an operation of a machine that performs a predetermined task on an object, comprising:
an imaging device that images the object; and
a controller that controls an operation of the imaging device and the machine,
the controller comprising:
a position conversion unit that detects the object from an image imaged by the imaging device and converts a detection position of the detected object on an image coordinate system or a sensor coordinate system into a detection position of the object on a machine coordinate system, wherein the image coordinate system is a coordinate system of the image, the sensor coordinate system is a coordinate system of the imaging device, and the machine coordinate system is a coordinate system of the machine;
an operation control unit that controls the operation of the machine based on the detection position of the object on the machine coordinate system, or based on a compensation amount based on an error between the detection position of the object on the machine coordinate system and a predetermined reference position of the object on the machine coordinate system, so that the machine performs the predetermined task with respect to the detection position of the object on the machine coordinate system;
a position reconversion unit that reconverts the detection position of the object on the machine coordinate system converted by the position conversion unit, or a compensation position based on the reference position of the object on the machine coordinate system and the compensation amount into a detection position of the object or a compensation position on the sensor coordinate system; and
a position determination unit that determines whether the detection position of the object or the compensation position on the sensor coordinate system, which is reconverted by the position reconversion unit, is within a predetermined detection range in the image on the sensor coordinate system.

3. A control system that controls an operation of a machine that performs a predetermined task on an object, comprising:
an imaging device that images the object; and
a controller that controls an operation of the imaging device and the machine,
the controller comprising:
a position conversion unit that detects the object from an image imaged by the imaging device and converts a detection position of the detected object on an image coordinate system or a sensor coordinate system into a detection position of the object on a machine coordinate system, wherein the image coordinate system is a coordinate system of the image, the sensor coordinate system is a coordinate system of the imaging device, and the machine coordinate system is a coordinate system of the machine;
an operation control unit that controls the operation of the machine based on the detection position of the object on the machine coordinate system, or based on a compensation amount based on an error between the detection position of the object on the machine coordinate system and a predetermined reference position of the object on the machine coordinate system, so that the machine performs the predetermined task with respect to the detection position of the object on the machine coordinate system;
a position reconversion unit that reconverts the detection position of the object on the machine coordinate system converted by the position conversion unit, or a compensation position based on the reference position of the object on the machine coordinate system and the compensation amount into a detection position of the object or a compensation position on the image coordinate system; and
a position determination unit that determines whether the detection position of the object or the compensation position on the image coordinate system, which is reconverted by the position reconversion unit, is within a predetermined detection range in the image on the image coordinate system.

4. The control system according to claim 1, wherein the controller further comprises a notification control unit that, if the position determination unit determines that the detection position of the object or the compensation position is not within the detection range, externally notifies that the detection position of the object or the compensation amount on the machine coordinate system, which is used in the operation control unit, is not correct.

5. The control system according to claim 1, wherein the controller further comprises a stop control unit that stops the operation of the machine if the position determination unit determines that the detection position of the object or the compensation position is not within the detection range.

6. The control system according to claim 2, wherein the controller further comprises a notification control unit that, if the position determination unit determines that the detection position of the object or the compensation position is not within the detection range, externally notifies that the detection position of the object or the compensation amount on the machine coordinate system, which is used in the operation control unit, is not correct.

7. The control system according to claim 2, wherein the controller further comprises a stop control unit that stops the operation of the machine if the position determination unit determines that the detection position of the object or the compensation position is not within the detection range.

8. The control system according to claim 3, wherein the controller further comprises a notification control unit that, if the position determination unit determines that the detection position of the object or the compensation position is not within the detection range, externally notifies that the detection position of the object or the compensation amount on the machine coordinate system, which is used in the operation control unit, is not correct.

9. The control system according to claim 3, wherein the controller further comprises a stop control unit that stops the operation of the machine if the position determination unit determines that the detection position of the object or the compensation position is not within the detection range.

* * * * *